73-662 SR
XR 2,917,626
SEARCH ROOM
SUBSTITUTE FOR MISSING XR
Dec. 15, 1959 T. USHER, JR 2,917,626
PEAK-NOTCH EQUALIZER
Filed March 10, 1958
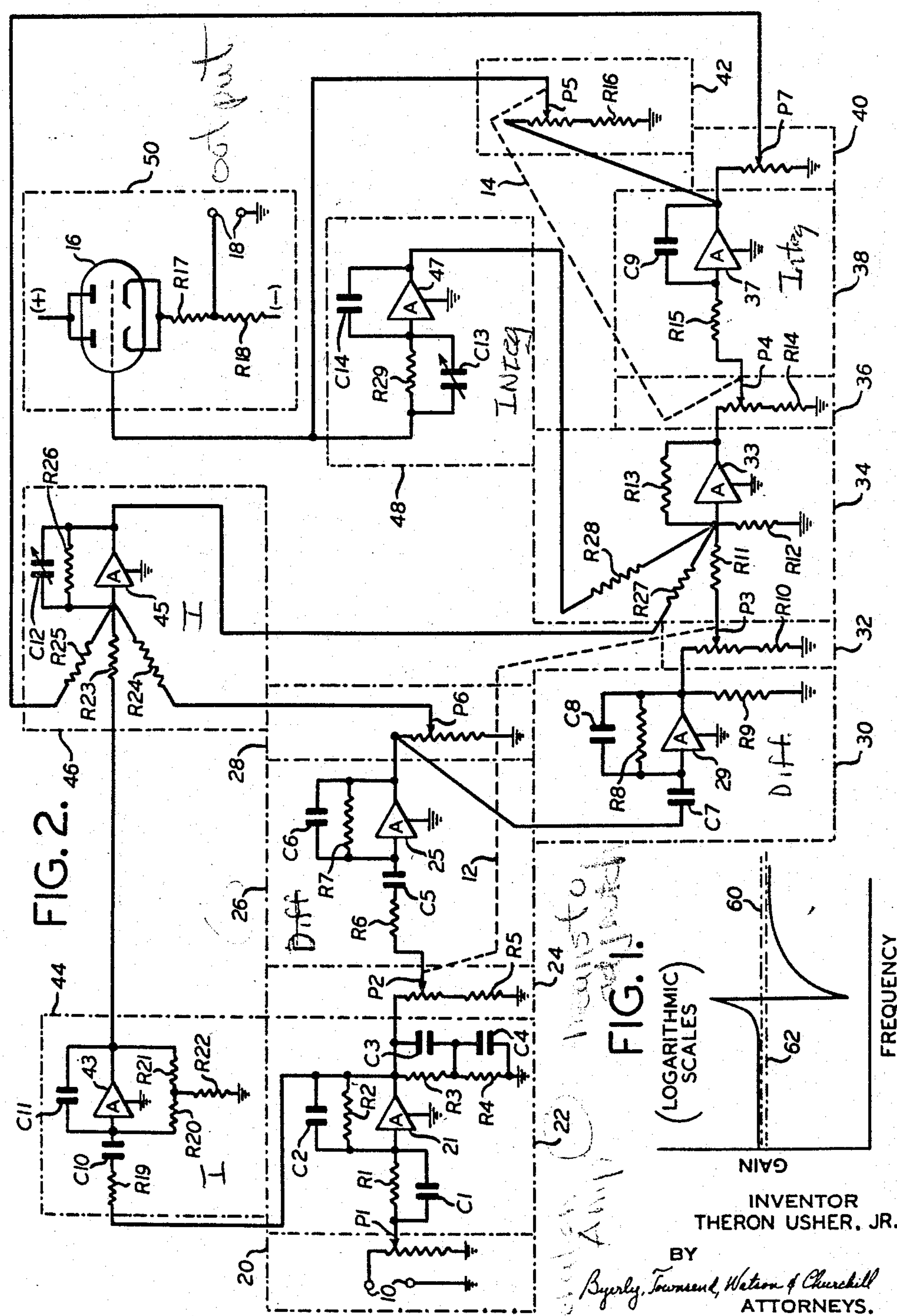
INVENTOR
THERON USHER, JR.
BY
Byerly, Townsend, Watson & Churchill
ATTORNEYS.
2917626
OR IN 328/127

United States Patent Office 2,917,626

Patented Dec. 15, 1959

2,917,626

PEAK-NOTCH EQUALIZER

Theron Usher, Jr., New Haven, Conn., assignor to Textron Inc., Providence, R.I., a corporation of Rhode Island Application March 10, 1958, Serial No. 720,235

7 Claims. (Cl. 250—27)

The present invention relates to vibration testing equipment or systems and more particularly to a peak-notch equalizer therefor.

With the advent of vehicles such as pilotless aircraft, missiles, and the like, the need for effective vibration testing of the component parts thereof has become more and more important. Vibration testing equipment is designed to simulate the environmental vibrations which the component will encounter in the vehicle. A typical system includes a test signal source supplying a large power amplifier which controls a vibration exciter provided with a test table. The vibration exciter is a device for converting electrical energy into mechanical vibratory energy. For accurate testing, the accelerations imparted to the specimen by the test table of the vibration exciter must be accurately controlled.

In reproducing vibrational environments one method involves recording on tape the signals generated by a vibration pickup located on the vehicle in which the specimen or component is to be installed. In order to produce table accelerations corresponding to the recorded signals representing the observed environment, a constant ratio between the exciter table acceleration and the input voltage to the system is required throughout the frequency range. Unfortunately, the ratio of table acceleration to exciter input voltage generally is not constant at all frequencies.

The vibration exciter is characterized by a plurality of resonances some due to the inherent characteristic of the exciter and others to the resonant characteristics of the specimen. It is the resonances introduced by the specimen with which the present invention is concerned.

It has been found that whenever a part of the specimen is driven into resonant mechanical oscillation there is a reaction upon the vibration exciter. This reaction develops a resonant and anti-resonant response in the transfer function of the vibration exciter. This alteration in the transfer function or gain-frequency characteristic of the exciter is sometimes referred to as a peak-notch pair. Accompanying the peak-notch pair is a change in response level between frequencies above and below the resonant frequencies.

In order to obtain a constant ratio between table acceleration and input voltage, it is necessary to include one or more peak-notch equalizers in the circuit between the test signal source and the power amplifier. A peak-notch equalizer will be required for each peak-notch pair developed by specimen resonances. If the peak-notch equalizer is provided with the exact inverse frequency characteristic of that introduced by the specimen, the compensation will be complete.

In accordance with the present invention there is provided a peak-notch equalizer having a gain-frequency characteristic which is the exact inverse of the frequency characteristic of a vibration exciter caused by a single resonant point in a specimen.

The invention will be better understood after reading the following detailed description of one preferred embodiment of the present invention with reference to the appended drawing in which:

Fig. 1 is a logarithmic plot of the gain with respect to frequency of an ideal peak-notch equalizer; and Fig. 2 is a schematic circuit diagram of a peak-notch equalizer having the characteristic shown in Fig. 1.

Referring now to the graph of Fig. 1, there is plotted therein to logarithmic scales the gain-frequency characteristic required of an ideal peak-notch equalizer. It will be understood that an inversion of the curve will represent a peak-notch pair as reflected into the vibration exciter by resonance in the specimen. It should be observed that the curve starts at low frequency asymptotic to the horizontal line 60 and then rises sharply to the peak or maximum gain point. The curve then drops sharply to the notch or minimum gain point and then returns in an asymptotic manner approaching the horizontal line 62. The difference in gain between line 60 and 62 represents the change in response level mentioned previously. Although the curve appears almost as a vertical line between the peak and the notch it should be understood that in practice it would normally have a negative slope depending upon the spread between the peak and notch frequencies.

Referring now to Fig. 2, there is shown schematically a circuit in accordance with the present invention having a gain-frequency characteristic as shown in Fig. 1. A pair of terminals 10 are connected across a potentiometer P1 with the lower terminal grounded. Potentiometer P1 provides a gain control for the equalizer represented by the dot-dash box 20. The slider on potentiometer P1 is connected through the parallel combination of resistor R1 and capacitor C1 to the input of a high gain direct coupled amplifier represented by the symbol A within a triangle and designated by the reference numeral 21.

It will be noted that a number of additional amplifiers represented by the same symbol appear in the circuit of Fig. 2. It is to be understood that these amplifiers are all identical. Although not shown in the drawing, it should also be understood that each of the amplifiers are provided with means for applying operating voltages thereto. A typical amplifier which is preferred for use in the present circuit is manufactured by George A. Philbrick, Researches, Inc. of Boston, Massachusetts, and sold under their type designation "K2W." This amplifier contains two twin triodes with one connected to provide a differential amplifier input and the other functioning as voltage amplifier and cathode follower output. As used in the present circuit, the input signals are supplied to the differential section of the amplifier such that the output from the cathode follower is shifted 180° in phase. That is, an input signal to the amplifier is inverted in passing therethrough. Also not shown for each of the amplifiers is a level control determining the bias on the control grid of the reference half of the differential section thereof.

A parallel arrangement of resistor R2 and capacitor C2 is connected between the input of amplifier 21 and its output. Connected between the output of amplifier 21 and ground is a series parallel arrangement of resistors R3 and R4 and capacitors C3 and C4. The circuit thus described in the dot-dash box 22 constitutes an operational amplifier designed to invert the phase of the incoming signal.

The output of amplifier 21 is connected over a first path to potentiometer P2 and R5 in series. These elements shown in dot-dash box 24 form a portion of the means for adjusting the frequency at which the notch in the response curve occurs.

The slider on potentiometer P2 is connected through resistor R6 and capacitor C6 in series to the input of amplifier 25. Resistor R7 in parallel to capacitor C6 provides a feedback path between the output of amplifier 25 and its input. These elements in box 26 constitute an operational amplifier for inverting the signal supplied to its input. For this purpose resistors R6 and R7 are made large and of equal value while capacitor C5 and capacitor C6 introduce some minor phase correction.

The output of amplifier 25 is connected over a first path through capacitor C7 to the input of amplifier 29. The output of amplifier 29 is connected back to its input through resistor R8 and capacitor C8 in parallel. The amplifier output is also connected across resistor R9. Thus, the elements in box 30 provide a differentiating circuit in the form of an operation amplifier. This is accomplished by suitably proportioning capacitor C7 with respect to resistor R8. As mentioned before, it is to be understood that the signals undergo a phase shift of 180° in passing through amplifier 29. In addition there is introduced an additional shift of 90° implicit in the differentiation.

An output of amplifier 29 is also connected across potentiometer P3 and resistor R10 in series. The slider of potentiometer P3 is ganged over mechanical connection 12 with the slider of potentiometer P2 and forms therewith the frequency adjustment for the notch in the response curve. As shown in the drawing elements P3 and R10 are included within box 32.

The slider on potentiometer P3 is connected electrically through resistor R11 to the input of amplifier 33. The output of amplifier 33 is coupled back to its input through resistor R13. A second input to amplifier 33 is supplied from a portion of the circuit yet to be described through an input resistor R27. A third input to amplifier 33 is supplied through resistor R28. Thus the circuit within the dot-dash box 34 represents an operational amplifier for providing an output signal representative of the sum of the signals received through resistors R11, R27 and R28.

The output of amplifier 33 is connected across potentiometer P4 and resistor R14 in series. These elements included within box 36 represent a portion of the frequency control for the peak in the response curve. The slider on potentiometer P4 is connected through resistor R15 to the input of amplifier 37. Capacitor C9 connects the output of amplifier 37 back to its input. These elements in box 38 constitute an operational amplifier for performing integration. This is accomplished by suitably proportioning R15 with respect to C9.

The output of amplifier 37 is connected over two paths, one across potentiometer P7 and the other across potentiometer P5 and resistor R16 in series. Potentiometer P7 in box 40 constitutes the means for adjusting the damping in the vicinity of the peak in the response characteristic.

The slider on potentiometer P5 is ganged over mechanical link 14 with the slider on potentiometer P4. In this manner the elements in box 42 cooperate with the elements in box 36 to adjust the frequency at which the peak occurs in the response characteristic. The slider on potentiometer P7 is connected electrically through resistor R25 to the input of amplifier 45. The output of amplifier 45 is coupled back to its input through resistor R26 and trimmer capacitor C12. A second input to amplifier 45 is supplied through resistor R23 while a third input is supplied through resistor R24. Thus the circuit within dot-dash box 46 constitutes another summing amplifier similar to that previously described in conjunction with box 34.

It will be seen from the drawing that the resistor R24 in operational amplifier 46 is connected to the slider on potentiometer P6 which potentiometer is connected across the output of amplifier 25. This element in box 28 provides an adjustment for controlling the damping in the vicinity of the notch in the response characteristic. The output of amplifier 45 is connected to the resistor R27 described in connection with operational amplifier 34.

Now returning to the output of amplifier 21, it is connected over a separate path through resistor R19 and capacitor C10 in series to the input of amplifier 43. A feedback network is connected between the output and input of amplifier 43 consisting of capacitor C11 and resistors R20, R21 and R22. These elements in box 44 function as an integrating circuit in a manner similar to the operational amplifier 38 previously described. It is to be understood that with respect to both operational amplifiers 38 and 44 there is an additional 90° phase shift over and above the 180° phase shift through the amplifier.

The output of amplifier 43 is connected to the resistor R23 mentioned above in describing the summing circuit 46. Now returning to the slider on potentiometer P5 it is connected electrically to both the control grids of twin triode 16 and through resistor R29 and capacitor C13 in parallel to the input of amplifier 47. The output of amplifier 47 is coupled back through its input through capacitor C14. This circuit in box 48 with the exception of trimmer capacitor C13 is identical with the operational amplifier 38 and performs the function of integration. The output of amplifier 47 is connected to the resistor R28 in summing amplifier 34. Returning to twin triode 16 it is noted that the anodes are connected together and to a source of positive energizing voltage with the cathodes joined and connected to a negative potential through resistors R17 and R18 in series. The junction between R17 and R18 is connected to the upper one of the two terminals 18 while the lower terminal is connected to ground. It will be recognized that the circuit in box 50 is a conventional cathode follower. This circuit in box 50 is a conventional cathode follower. This circuit functions as the output stage for the equalizer.

In the same manner that potentiometer P7 controls the damping in the region of the peak in the response, the potentiometer P6 controls the damping in the vicinity of the notch.

It should be understood that the various potentiometers can be referred to as variable attenuators.

As an aid to the fabrication of the typical peak-notch equalizer, there is furnished hereinafter, a table providing typical values for all of the components. It is to be understood, however, that all of the circuit constants may be varied depending upon the range of frequency to be covered and the general character of the response desired.

| Component | Value |
|---|---|
| Potentiometers: | |
| P1 | 100K |
| P2 | 25K |
| P3 | 25K |
| P4 | 10K |
| P5 | 10K |
| P6 | 100K |
| P7 | 500K |
| Resistors: | |
| R1 | 1M |
| R2 | 1M |
| R3 | 1M |
| R4 | 120K |
| R5 | 110K |
| R6 | 1M |
| R7 | 1M |
| R8 | 1M |
| R9 | 1.09M |
| R10 | 110K |
| R11 | 270K |
| R12 | 1.01M |
| R13 | 1M |
| R14 | 45.5K |
| R15 | 91K |
| R16 | 45.5K |
| R17 | 390 |
| R18 | 56K 2W |

Resistors:

| | |
|---|---|
| R19 | 120K |
| R20 | 1M |
| R21 | 220K |
| R22 | 12K |
| R23 | 270K |
| R24 | 270K |
| R25 | 1M |
| R26 | 270K |
| R27 | 270K |
| R28 | 1M |
| R29 | 91K |

Capacitors:

| | |
|---|---|
| C1 | 100 |
| C2 | 100 |
| C3 | 100 |
| C4 | 820 |
| C5 | .08 mfd. |
| C6 | 12 |
| C7 | 1200 |
| C8 | 12 |
| C9 | .0025 mfd. |
| C10 | 2 mfd. |
| C11 | .010 mfd. |
| C12 | 9–180 |
| C13 | 9–180 |
| C14 | .0025 mfd. |

In the above table K represents $X10^3$ and M represents $X10^6$. All capacities are in micromicrofarads unless otherwise noted.

What I claim is:

1. A peak-notch equalizer comprising a pair of input terminals for receiving a test signal; a first integrating circuit having an input coupled to said terminals and having an output; a first summing circuit having a first input coupled to the output of said integrating circuit, having a second input coupled to said test terminals, having a third input, and having an output; a differentiating circuit having an input coupled to said test terminals, and having an output; a second summing circuit having a first input coupled to the output of said differentiating circuit, having a second input coupled to the output of said first summing circuit, having a third input, and having an output; a second integrating circuit having an input coupled to the output of said second summing circuit, and having an output; means coupling the output of said second integrating circuit to the third input of said first summing circuit; a third integrating circuit having an input coupled to the output of said second integrating circuit and having an output coupled to the third input of said second summing circuit; and an output terminal for the equalizer coupled to the output of said second integrating circuit.

2. A peak-notch equalizer comprising a pair of input terminals; a first integrating circuit having an input coupled to said terminals and having an output; a first summing circuit having an input and an output; means coupling the input of said first summing circuit to the output of said integrating circuit and to said terminals; a differentiating circuit having an input coupled to said terminals and having an output; a second summing circuit having an input and an output; means coupling the input of said second summing circuit to the output of said differentiating circuit and to the output of said first summing circuit; a second integrating circuit having an input coupled to the output of said second summing circuit and having an output; means coupling the output of said second integrating circuit to the input of said first summing circuit; a third integrating circuit having an input coupled to the output of said second integrating circuit and having an output coupled to the input of said second summing circuit; and output terminals coupled to the output of said second integrating circuit.

3. A peak-notch equalizer according to claim 2, wherein each of said integrating, differentiating, and summing circuits comprises an operational amplifier including a direct current high gain electronic amplifier and a negative feedback network.

4. A peak-notch equalizer according to claim 2, wherein a first variable attenuator is included in the means coupling the input of the first summing circuit to the input terminals, said attenuator being common to the coupling between said input terminals and the input of the differentiating circuit, and wherein a second variable attenuator is included in the means coupling the input of the second summing circuit to the output of the differentiating circuit, said first and second attenuators being ganged together for simultaneous operation to adjust the frequency at which the notch in the gain characteristic occurs.

5. A peak-notch equalizer according to claim 2, wherein a variable attenuator is included in the means coupling the input of the first summing circuit to the input terminals for adjusting the damping at the frequency at which the notch in the gain characteristic occurs.

6. A peak-notch equalizer according to claim 2, wherein a first attenuator is included in the coupling between the output of the second summing circuit and the input of the second integrating circuit, and wherein a second attenuator is included in the coupling between the output of the second integrating circuit and the input of the third integrating circuit, said attenuators being ganged together for simultaneous operation to adjust the frequency at which the peak in the gain characteristic occurs.

7. A peak-notch equalizer according to claim 2, wherein an attenuator is included in the means coupling the output of the second integrating circuit to the input of the first summing circuit for adjusting the damping at the frequency at which the peak in the gain characteristic occurs.

References Cited in the file of this patent

Samuel and Seeley: "Electron Tube Circuits," McGraw-Hill, 1958, pp. 246–281.